June 15, 1926.
E. G. ACKERMAN ET AL
1,588,434
ANTIFRICTION DEVICE FOR SPRINGS
Filed May 6, 1922
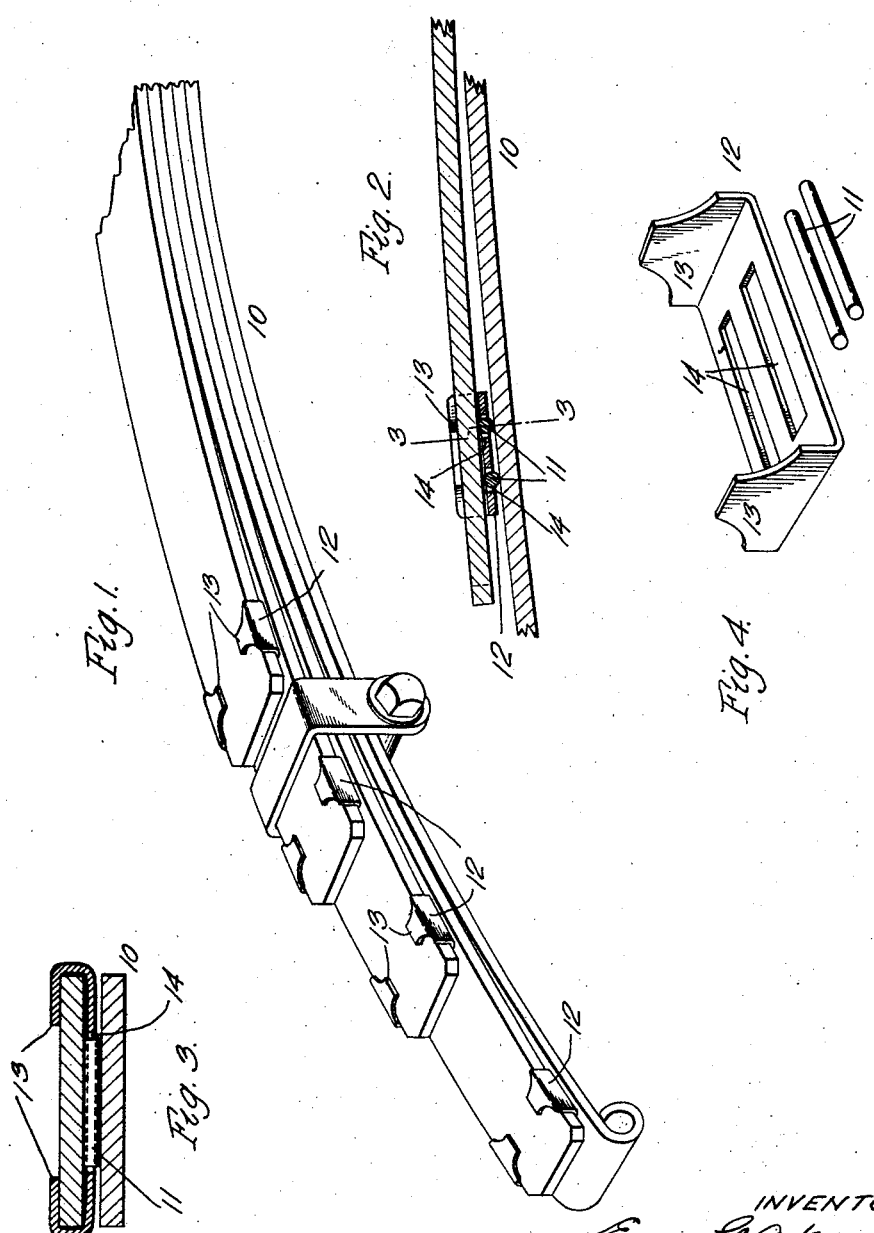
INVENTORS.
Eugene G. Ackerman,
and Charles F. Ernst,
by Parker & Rackman
their ATTORNEYS.

Patented June 15, 1926.

1,588,434

UNITED STATES PATENT OFFICE.

EUGENE G. ACKERMAN AND CHARLES F. ERNST, OF BUFFALO, NEW YORK; SAID ACKERMAN ASSIGNOR TO ARTHUR G. ERNST, OF BUFFALO, NEW YORK.

ANTIFRICTION DEVICE FOR SPRINGS.

Application filed May 6, 1922. Serial No. 558,992.

This invention relates to roller bearings or antifriction devices for use on leaf springs for reducing the friction between the component leaves or plates of the springs. In springs of that type which are composed of a plurality of connected spring leaves or plates, the leaves or plates have a sliding movement relative to each other in the operation of the spring, and where, as usual the leaves bear directly one against the other, the resultant friction between the leaves is often so great that the end of one leaf will appreciably cut or wear the adjacent leaf or plate on which it bears.

One object of this invention is to provide a simple and inexpensive device which can be readily applied to leaf springs to provide rolling bearings between the leaves or plates composing the springs, thereby reducing the friction and wear between the leaves and insuring a freer, easier action of the spring. Other objects are to provide roller bearings for springs which can be quickly and easily applied to the leaf springs of automobiles and other vehicles by unskilled persons with ordinary tools; also to construct the device so that the bearing rollers which are confined between adjacent leaves of the spring will have rolling contact with both of the adjacent spring leaves; also to produce a roller bearing for leaf springs which consists of a single-piece retainer which can be readily stamped from sheet metal, and rollers which are confined in operative position by the retainer but are disconnected or separate from the retainer and do not require to be attached to the retainer.

In the accompanying drawings:

Fig. 1 is a fragmentary perspective view of a leaf spring provided with roller bearings embodying the invention.

Fig. 2 is a fragmentary longitudinal sectional elevation thereof on a larger scale.

Fig. 3 is a transverse section thereof on line 3—3, Fig. 2.

Fig. 4 is a perspective view showing the roller bearing before application to the spring and with the rollers out of the retainer.

10 represents a leaf spring, which as usual, is composed of a plurality of spring leaves or plates of graduated lengths arranged one above or against the other so that each leaf terminates short of the next adjacent leaf. Such springs are commonly used on vehicles in various different arrangements which are well known and need not be explained, the spring leaves being secured together or held at one end, or between their ends, in the case of a double ended spring. The roller bearing forming the subject-matter of this invention is applicable to springs of such different constructions or arrangements, the bearing rollers being disposed between the relatively movable ends or portions of the leaves.

The roller bearing comprises one or more, preferably two, slender cylindrical rollers 11, and a retainer 12 which extends between adjacent leaves or spring plates of the spring 10 and retains the rollers 11 between the adjacent spring leaves extending transversely thereof so that the rollers form a rolling bearing for the leaves. The retainer shown consists of a single-piece sheet metal stamping adapted to extend transversely between adjacent leaves of the spring and provided with opposite bent ends 13 adapted to engage the opposite edges of one of the spring leaves and to have their extremities bent inwardly over the edges of the spring leaf, as shown in Fig. 3, to secure the retainer in place. For this purpose the extremities of the bent ends 13 of the retainer are preferably reduced so that they can be readily bent over the spring by means of an ordinary hammer or tool. The retainer is provided in the body portion thereof between the bent ends 13 with one or more slots 14 one for each of the rollers 11. The slots are of such size that the rollers are confined loosely and adapted to turn freely therein, and the body of the retainer is of less thickness than the diameter of the rollers so that the two spring leaves between which the rollers are located will bear directly upon the rollers. The rollers do not bear or roll on the retainer but have rolling contacts directly with both spring leaves on opposite sides of the rollers, and are merely loosely retained in place between the spring leaves transversely thereof by the retainer. Since the retainer of each bearing is movable with one of the spring leaves relatively to the adjacent leaf at the opposite side of the bearing rollers, the retainer slots 14 in which the rollers are confined are preferably made of a width such as to allow sufficient play of the rollers in the slots to ensure free rolling contact between the leaves throughout their relative movement, while nevertheless retaining the rollers substantially perpendicular to the direction of the relative movement of the spring leaves.

One of the roller bearings can be provided between each two leaves of the spring, or the bearings used between only a portion of the leaves of the spring, as may be desired, depending upon the desired action of the spring. As shown in Fig. 1, one of the roller bearing devices is provided between each two adjacent leaves of the springs, the retainer being secured adjacent to the free end of the shorter of the two leaves.

To apply the roller bearings to the spring or springs of a vehicle, it is preferable to jack up the body of the vehicle in order to reduce the weight on the springs, and then drive or force a chisel or other thin edged tool between the leaves of the spring to separate the leaves sufficiently to permit the retainer with the rollers in place in the slots thereof to be slipped between the leaves. The retainer is then secured by bending the extremities thereof over the edges of the adjacent spring leaf and the chisel or tool withdrawn. The roller retainers can be made of suitable lengths to fit springs of different widths and are preferably made of such lengths that the bent ends of the retainers will fit snugly against the edges of the spring leaves so that when the extremities of the ends are bent over the edges of the leaf onto the outer face thereof, the retainer will be held securely in place on the spring. This frictional engagement of the ends of the retainer with the outer face of the leaf in addition to the firm contact with the opposite edges of the leaf, enables the body portion of the retainer to be secured in a fixed position out of contact with the opposed inner faces of the leaves, thereby eliminating friction between the retainer and the leaves and permitting a free and easy action of the rollers.

We claim as our invention:

1. A roller bearing for leaf springs comprising a one-piece sheet metal roller retainer secured to the spring and having a body portion extending between adjacent leaves thereof, said body portion having a slot, a roller arranged in said slot and forming a bearing for the opposed faces of said adjacent leaves, an integral securing portion at each end of said body member which is perpendicular thereto and is adapted to engage the side edges of one of said leaves, the ends of said securing portions being adapted to be bent over to engage the outer face of said leaf to rigidly maintain said bearing on the spring with the body member out of contact with the adjacent spring leaf face.

2. A roller bearing for leaf springs comprising a one-piece sheet metal roller retainer secured to the spring and having a body portion extending between adjacent leaves thereof, said body portion having a slot, a roller arranged in said slot and forming a bearing for the opposed faces of said adjacent leaves, an integral securing portion at each end of said body member which is perpendicular thereto and is adapted to engage the side edges of one of said leaves, and a lug at the extremity of each of said securing portions, said lugs being of reduced width adapting them to be bent over to engage the outer face of said leaf to rigidly maintain said bearing on the spring with the body member out of contact with the adjacent spring leaf face.

EUGENE G. ACKERMAN.
CHARLES F. ERNST.